United States Patent
Park et al.

(10) Patent No.: US 7,050,046 B1
(45) Date of Patent: May 23, 2006

(54) DEVICE AND METHOD FOR RECOGNIZING CHARACTERS INPUT THROUGH A TOUCH SCREEN

(75) Inventors: Joung-Kyou Park, Seoul (KR); Jung In Do, Seoul (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 09/447,080

(22) Filed: Nov. 22, 1999

(30) Foreign Application Priority Data

Nov. 20, 1998 (KR) ................................. 1998-49885

(51) Int. Cl.
*G09G 5/00* (2006.01)

(52) U.S. Cl. ...................... 345/173; 382/187; 382/189

(58) Field of Classification Search ........ 345/173–178, 345/157–158, 141–142, 87, 116, 333–334, 345/339–340, 348; 341/22, 28; 382/181–189, 382/229–230, 315, 321, 317, 202; 178/18.01–18.09, 178/19.03, 20.01; 235/380; 713/320; 710/107
See application file for complete search history.

(56) References Cited

U.S. PATENT DOCUMENTS

| | | | | |
|---|---|---|---|---|
| 5,361,310 A | * | 11/1994 | Ishigaki ...................... 382/187 |
| 5,404,458 A | * | 4/1995 | Zetts ............................ 710/73 |
| 5,579,489 A | * | 11/1996 | Dornier et al. .............. 710/101 |
| 5,594,810 A | * | 1/1997 | Gourdol ...................... 382/187 |
| 5,864,635 A | * | 1/1999 | Zetts et al. .................. 382/187 |
| 5,917,475 A | * | 6/1999 | Kuzunuki et al. ........... 345/173 |
| 6,005,549 A | * | 12/1999 | Forest ......................... 345/157 |
| 6,008,799 A | * | 12/1999 | Van Kleeck ................. 345/173 |
| 6,058,485 A | * | 5/2000 | Koziuk et al. .............. 713/320 |
| 6,292,857 B1 | * | 9/2001 | Sidoroff et al. ............... 710/54 |
| 6,611,258 B1 | * | 8/2003 | Tanaka et al. .............. 345/179 |

OTHER PUBLICATIONS

Josephson, Alan "DSP-Based handprinted Character Recognition" Application report, pp. 1-7 Oct. 1994.*

* cited by examiner

*Primary Examiner*—Regina Liang
*Assistant Examiner*—Jennifer T. Nguyen
(74) *Attorney, Agent, or Firm*—Dilworth & Barrese LLP

(57) ABSTRACT

A character recognition device for recognizing characters input through a touch screen, comprises a touch screen data recorder for storing the touch screen data generated from an input of a character, a timer for counting a predetermined waiting threshold time when there is no touch screen data generated, and a character recognition processor for performing character recognition of the stored touch screen data as a character. If freshly stored touch screen data is generated before the completion of counting the predetermined waiting threshold time, the freshly stored touch screen data is added to the previous touch screen data to complete the character.

6 Claims, 4 Drawing Sheets

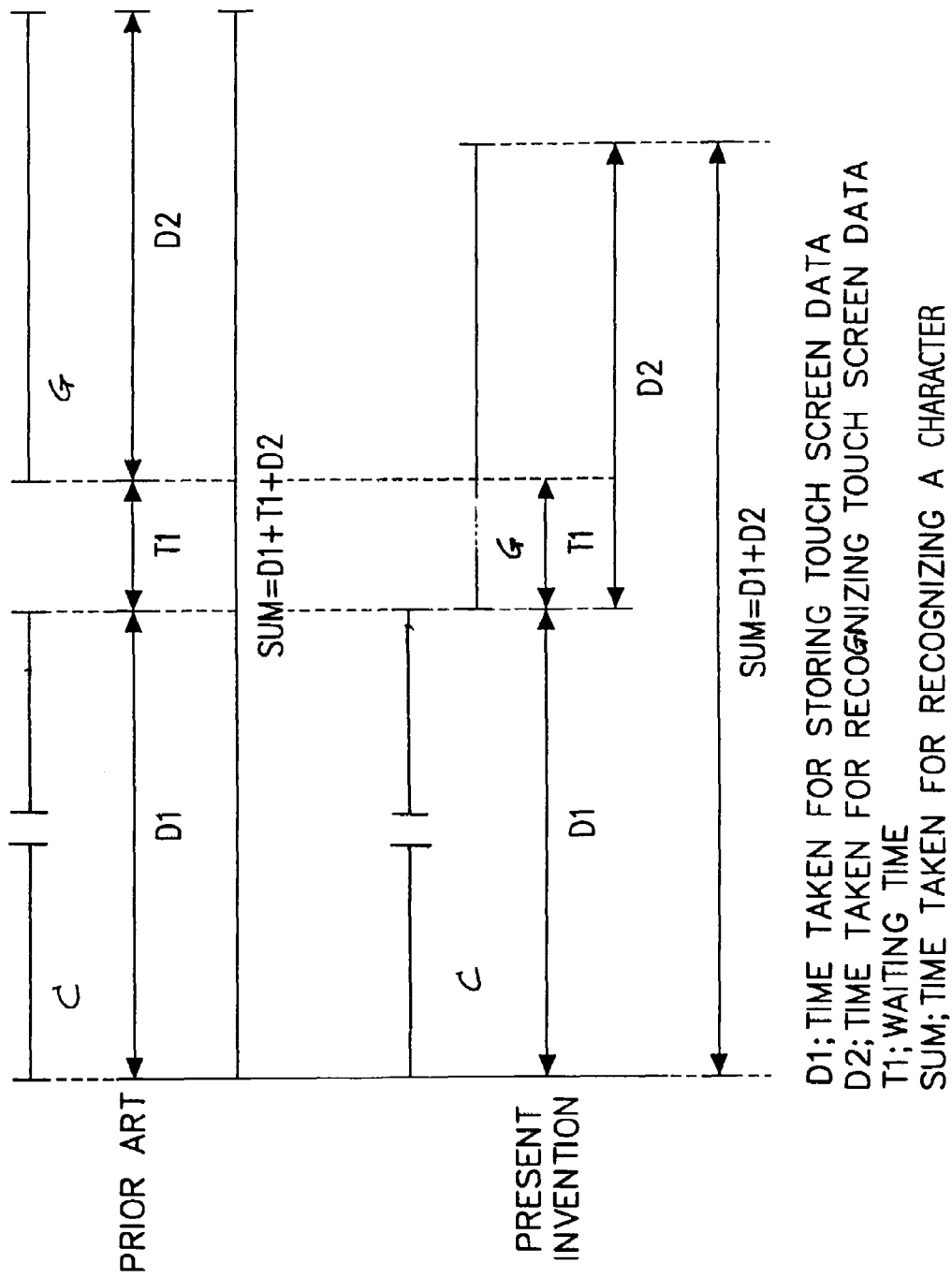

DEVICE AND METHOD FOR RECOGNIZING CHARACTERS INPUT THROUGH A TOUCH SCREEN

PRIORITY

This application claims priority to an application entitled "Device for Recognizing Characters inputted through a Touch Screen and Method Thereof" filed in the Korean Industrial Property Office on Nov. 20, 1998 and assigned Serial No. 98-49885, the contents of which are hereby incorporated by reference.

BACKGROUND OF THE INVENTION

1. Field of the Invention

The present invention relates to a character recognition device for recognizing characters inputted through a touch screen in an information instrument such as a hand phone, PDA (Personal Digital Assistant), palm-sized computer, etc.

2. Description of the Related Art

At present, information instruments can be provided with a touch screen or digitizer to make it possible for the user to input character data, which is recognized by a character recognition device. In order to correctly recognize what characters are inputted by a user through such an information instrument, the character recognition device should be provided with means for determining the completion of inputting the characters. Particularly, a Korean character generally consists of a lot of strokes respectively representing the initial, intermediate and last sounds, and therefore, it is much more difficult to correctly determine the completion of a Korean character compared to Indo-European languages such as English. Naturally, the speed with which the character recognition device recognizes a Korean character is significantly reduced compared to the speed with which the character recognition device recognizes an English character. Conventionally, the character recognition device recognizes a character represented by the inputted characters as follows:

The first method is to set a predetermined waiting threshold time which is used to determine the completion of inputting characters. Namely, if there is no further input by the user within the threshold time, it is determined that the character is completed. Then, the character recognition procedure is performed to identify the completed character represented by the inputted characters. The second method is to define a particular position on the touch screen as the completion signaling zone, which is touched to signal when the character is complete. The third method is to divide the touch screen into two parts, one of which is used as the character input screen, and the other as a determination screen which displays the inputted characters to represent the completion of inputting characters. The fourth method is to set the device to perform character recognition at the completion of each stroke. However, the first method requires a waiting threshold time period prior to the character recognition process, thus resulting in time consumption. The second method requires additional user input to represent the completion of inputting characters. The third method is not applicable to the small size of the display on a hand phone. The last method is also hardly applicable to the Korean language, which consists of initial, intermediate and last sound characters, though it may be readily applied to the English language.

SUMMARY OF THE INVENTION

It is an object of the present invention to provide a character recognition device and method for correctly and quickly recognizing characters inputted through a touch screen, which does not require a separate waiting time period prior to character recognition.

It is another object of the present invention to provide a character recognition device and method for performing character recognition after each stroke is completed, without delaying.

According to an aspect of the present invention, a character recognition device for recognizing characters inputted through a touch screen comprises a touch screen data recorder for storing the touch screen data, a timer for counting a predetermined waiting threshold time period when there is no touch screen data generated, and a character recognition processor for performing character recognition of the stored touch screen data as a character, wherein a freshly stored touch screen data generated before the completion of counting the threshold time is added to the previous touch screen data to complete the character.

According to another aspect of the present invention, a character recognition method for recognizing characters inputted through a touch screen comprises the steps of storing the touch screen data generated according to an inputted character; if additional touch screen data is generated and stored before a predetermined waiting threshold time runs out, adding the freshly stored touch screen data to the previous touch screen data; if the predetermined waiting threshold time runs out before additional touch screen data is generated and stored, performing character recognition of the stored touch screen data as a character; and outputting the character code corresponding to the result of the character recognition when a further touch screen data is not recognized within the predetermined waiting threshold time.

The present invention will now be described more specifically with reference to the drawings attached only by way of example.

BRIEF DESCRIPTION OF THE DRAWINGS

FIG. 4 is a diagram illustrating the speed of performing the inventive character recognition device compared to that of the conventional one.

DETAILED DESCRIPTION OF THE PREFERRED EMBODIMENT

Figure 1:
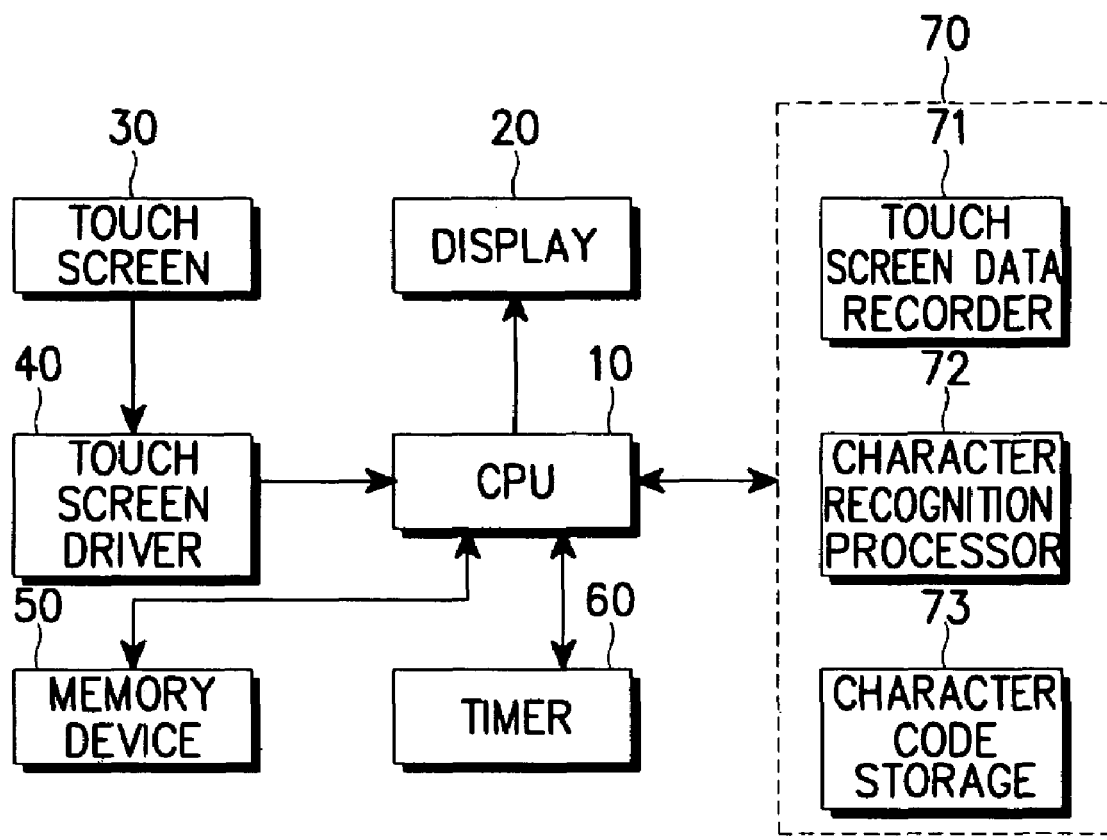
FIG. 1 is a block diagram illustrating the structure of a character recognition device according to the present invention.

Referring to FIG. 1, a character inputted through a touch screen 30 is converted by a touch screen driver 40 into corresponding digital data, which is then applied to a CPU 10. The digital data will be hereafter referred to as touch screen data. Then, the CPU 10 controls a character recognition device 70 to recognize the character represented by the touch screen data. Using a prescribed character recognition program, the character recognition device 70 is operated to retrieve a character code corresponding to the touch screen data received from the CPU 10. The retrieved character code is transferred to the CPU 10, used to display the corresponding character on a display 20, or stored in a memory device 50. In character recognition, it is important to determine how many strokes are input to complete a character. This is achieved by setting a timer 60 to count a predetermined waiting threshold time, which is a reference time period that indicates the completion of inputting strokes to make a character. Namely, if there is no further stroke input from the touch screen 30 within the predetermined waiting threshold time, it is considered the completion of inputting a character. The timer 60 may be implemented by means of hardware or software as desired. The memory device 50 includes a volatile memory, such as RAM, and nonvolatile memory, such as flash memory or EEPROM, storing the initial service data, character recognition program, and data required for the execution of the character recognition program together with the OS (Operating System) program. It also serves as a buffer for temporarily storing data processed during the character recognition operation. The OS program should be designed to perform multi-tasking, as, for example, the REX program does.

The display 20 preferably consists of an LCD, and displays the operational states of the character code recognition device as well as the processed character codes. It is preferably integrated with the touch screen 30. The character recognition device 70 comprises a touch screen data recorder 71, character recognition processor 72 and character code storage 73. The touch screen data recorder 71 stores the touch screen data in a buffer. The recording of the touch screen data is performed based on the threshold time set by the timer 60. The character recognition processor 72 processes the touch screen data recorded by the touch screen data recorder 71. Namely, if the input of a character is completed and recorded, the character recognition processor is driven to identify the inputted character. The character code storage 73 stores a number of codes, which are retrieved by the character recognition processor and are used to display characters on the display 20.

Figure 2:
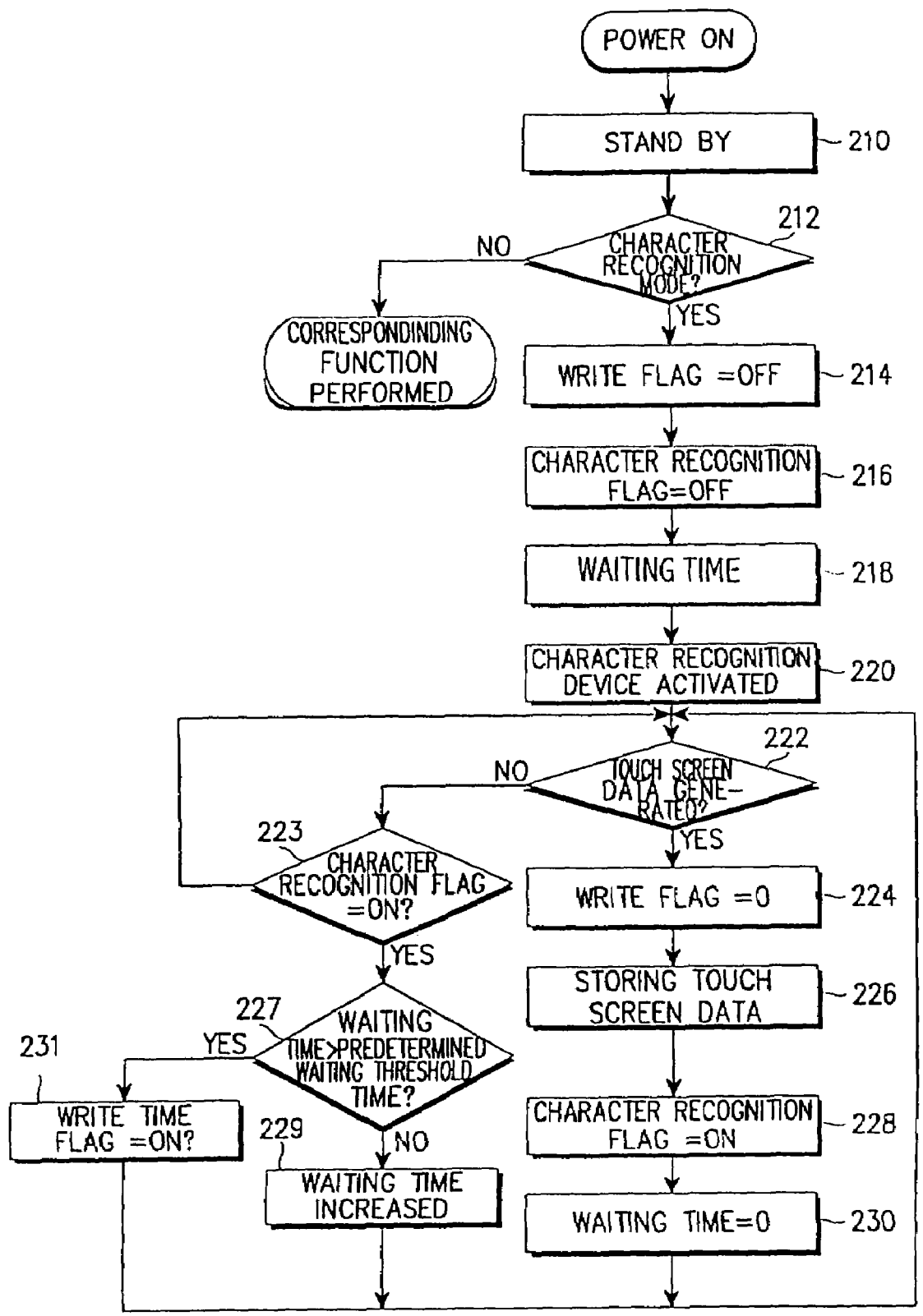
FIG. 2 is a flow chart illustrating the process of recognizing characters through multi-tasking according to the present invention.

Referring to FIG. 2, it is determined in step 212 whether the user wishes to enter character recognition mode from the standby state of step 210. If so, the write flag is turned off in step 214. The write flag is a reference signal to enable the touch screen data recorder 71 to record the touch screen data inputted through the touch screen 40. Then, in step 216, the character recognition flag is turned off. The character recognition flag is a reference signal to enable the character recognition processor 72 to process the recorded touch screen data. In step 218, the timer 60 is initialized to zero, thus initializing the waiting time. The timer 60 is set to count to the predetermined waiting threshold time, which as previously described is a reference time to determine the completion of inputting characters. For example, when the user inputs a first stroke $c$ and then a second stroke $\neg$ the CPU 10 must determine, based on the predetermined waiting threshold time, whether the user intended to input the character "$c$", or the character "$G$". The waiting threshold time period is the average time interval taken between inputting one character and inputting the next character. Hence, when the fresh input of a stroke is detected before the timer 60 has counted to the predetermined waiting threshold time, it is determined that the freshly input stroke should be combined with the previously input strokes so as to form a single character. Otherwise, the freshly input stroke is considered the initial stroke of the next character. The initialization of the timer 60 to zero in step 218 means deleting the time counted for the character previously inputted.

In step 220, the character recognition device 70 is activated for immediate processing. The character recognition device 70 performs various functions according to the states of the write flag and character recognition flag. The flag signals may be implemented by means of mail boxes if desired. The various functions of the character recognition device 70 are performed according to their preset priorities. In step 222, the CPU 10 periodically polls the touch screen 30 to detect touch screen data. If a touch screen data is detected in step 222, the write flag is turned on in step 224. Detecting the write flag turned on, the touch screen data recorder 71 of the character recognition device 70 stores the touch screen data in the buffer in step 226. Then, in step 228, the character recognition flag is turned on to initiate the character recognition procedure of the character recognition processor 72. Thus, each time a single stroke is completed, the character recognition device is driven immediately. In step 230, the waiting time is set to zero to initialize the timer 60. Then, the CPU 10 returns to step 222. Thus, whenever one stroke is completed, the timer 60 is operated and character recognition is accomplished at the same time as initializing the timer 60.

Figure 3:
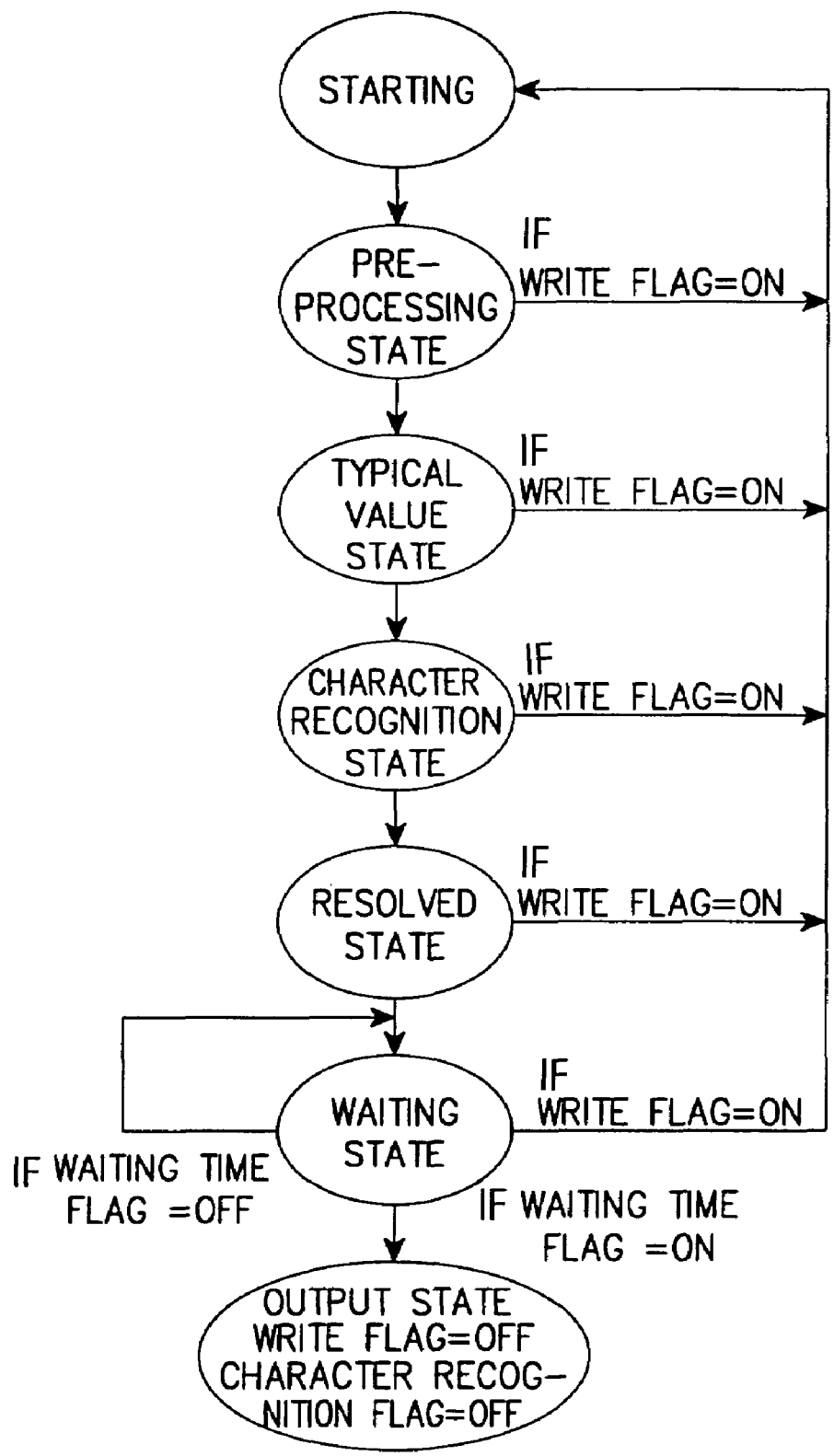
FIG. 3 is a state diagram illustrating the changed states of a character recognition device according to the present invention.

If no touch screen data is detected in step 222, it is determined in step 223 whether the character recognition flag is turned on. If the character recognition flag is not turned on, it means that there is no character input and the process returns to step 222. However, if the character recognition flag is turned on, it indicates that the timer 60 is counting the time between the previous and the next input of strokes. So, this interval may be the time between the strokes of a single character, or the time between the last stroke of the previous character and the initial stroke of the next character. Subsequently, the character recognition processor 72 starts to recognize the touch screen data. In step 227, it is determined whether the waiting time on the timer 60 is greater than the predetermined waiting threshold time. If the waiting time on the timer 60 is not greater than the predetermined waiting threshold time, the waiting time on the timer 60 is increased in step 229 and the process returns to step 222. This means that the inputting of the strokes constituting a character is not complete. If the waiting time is greater than the predetermined waiting threshold time in step 227, it means that the inputting of the strokes constituting a character has been completed, and therefore, the waiting time flag is turned on in step 231. According to the waiting time flag, the touch screen recorder 71 and character recognition processor 72 are controlled to perform the character recognition of a character. Referring to FIG. 3, the character recognition device 70 is shifted to various functional states depending on whether the write flag is turned on or off. As described in the drawing, if the write flag is detected turned on while in any of the various functional states, the character recognition device is shifted to the initial state. According to all the states of FIG. 3, if more touch screen data is generated, the write flag is turned on and then it returns to the start state. That is, if more touch screen data is generated within the predetermined time period, character recognition is stopped to return to start state. In the waiting state, it is shifted according to the states of the waiting time flag and the write flag. In the waiting state, if the waiting time flag is on, it proceeds to the output state where the write flag is off and character recognition flag is off. However, if the write flag is on, it returns to the start state and, if the waiting time flag is off, it returns to the waiting state.

Referring to FIG. 4, the conventional method requires the whole character recognition time SUM, which is equal to the total of the touch screen recording time D1, waiting time T1 and character recognition time D2. In contrast, a method according to the present invention requires the whole character recognition time SUM, which is equal to either D1+T1 or D1+D2, whichever one is longer than the other. Thus, a method according to the present invention has a character recognition speed faster by at least T1 than the conventional method. FIG. 4 illustrates the compared character recognition time for inputting a character $_G$. As shown in the drawing, the conventional character recognition includes the steps of first recording the touch screen data for an inputted character, and second determining, based on the waiting time, whether the touch screen data represents the whole character, thus requiring the whole character recognition time of D1+T1+D2. In contrast, in a method according to the present invention, character recognition is performed as soon as touch screen data is recorded, regardless of the completion of inputting a character, thus requiring only one of D1+T1 or D1+D2, whichever one is longer than the other. The preferred method according to the present invention does not wait a predetermined waiting threshold time period before character recognition is performed. That is, character recognition is immediately performed without waiting.

While the present invention has been described with specific embodiments accompanied by the attached drawings, it will be appreciated by those skilled in the art that various changes and modifications may be made thereto without departing the gist of the present invention.

What is claimed is:

1. A character recognition device for recognizing a character input through a touch screen comprising:
    a touch screen data recorder for storing touch screen data generated from input of a stroke, wherein said character is recognized in response to said stroke or in response to a plurality of strokes;
    a timer for counting a predetermined waiting threshold time when there is no touch screen data generated; and
    a character recognition processor for performing character recognition of the stored touch screen data at each time when each stroke is input through said touch screen, wherein all the touch screen data are recognized as a single character when said predetermined waiting threshold time is completely counted,
    wherein the character recognition and the counting of the threshold time occur wherein character recognition is restarted in response to the start of a second stroke of said character.

2. A character recognition device as defined in claim 1, wherein said touch screen recorder and character recognition processor are designed to have multi-tasking functions, thereby performing the corresponding function when a touch screen data is generated and stored.

3. A character recognition device for recognizing characters input through a touch screen, comprising:
    a touch screen data recorder for storing touch screen data generated from an input of a first stroke of a character wherein character recognition is restarted in response to the start of a second stroke of said character
    a timer for counting a predetermined waiting threshold time when there is no touch screen data generated; and
    a character recognition processor for performing character recognition of said stored touch screen data as a character, wherein a freshly stored touch screen data generated before completion of counting the predetermined waiting threshold time is added to the previous
    a touch screen data recorder for storing touch screen data generated from an input of a first stroke of a character wherein character recognition is restarted in response to the start of a second stroke of said character.

4. A character recognition device as defined in claim 3, wherein said character recognition processor outputs a character code corresponding to a recognized character when another touch screen data is not generated before completion of counting to said predetermined waiting threshold time.

5. A character recognition method for recognizing characters input through a touch screen, comprising the steps of:
    storing touch screen data generated from an input of a first stroke of a character wherein character recognition is restarted in response to the start of a second stroke of said character
    performing character recognition of said stored touch screen data as a character; and
    in case that another touch screen data is generated within a predetermined waiting threshold time, stopping the above operation and adding both the previously generated touch screen data and the newly generated touch screen data together as one character to thereby storing touch screen data generated from an input of a first stroke of a character wherein character recognition is restarted in response to the start of a second stroke of said character.

6. A method as defined in claim 5, including the further step of outputting a character code corresponding to a result of said character recognition when a further touch screen data is not recognized within said predetermined waiting threshold time.

\* \* \* \* \*

UNITED STATES PATENT AND TRADEMARK OFFICE
CERTIFICATE OF CORRECTION

PATENT NO. : 7,050,046 B1
APPLICATION NO. : 09/447080
DATED : May 23, 2006
INVENTOR(S) : Joung-Kyou Park and Jung-In Do Page 1 of 1

It is certified that error appears in the above-identified patent and that said Letters Patent is hereby corrected as shown below:

With respect to Claim 1:

In column 5, line 45, after "occur", insert -- simultaneously, and --

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,050,046 B1
APPLICATION NO. : 09/447080
DATED : May 23, 2006
INVENTOR(S) : Joung-Kyou Park and Jung-In Do Page 1 of 1

It is certified that error appears in the above-identified patent and that said Letters Patent is hereby corrected as shown below:

With respect to Claim 3:

In column 6, at the end of line 6, after "character", insert -- ; --

In column 6, lines 7-8, delete "wherein character recognition is restarted in response to the start of a second stroke of said character"

In column 6, lines 16-18, replace "a touch screen data recorder for storing touch screen data generated from an input of a first stroke of a character" with -- touch screen data to complete said character, and --

With respect to Claim 5:

In column 6, line 29, after "stroke of a character", insert -- ; --

In column 6, lines 29-31, delete "wherein character recognition is restarted in response to the start of a second stroke of said character"

In column 6, lines 38-40, replace "storing touch screen data generated from an input of a first stroke of a character" with -- perform the character recognition, and --

Signed and Sealed this

Sixteenth Day of February, 2010

David J. Kappos
*Director of the United States Patent and Trademark Office*